(12) United States Patent
Frait (10) Patent No.: US 8,647,078 B2
(45) Date of Patent: Feb. 11, 2014

(54) MOTOR PUMP ASSEMBLY FOR TRANSMISSION VALVE BODY

(75) Inventor: Steven A. Frait, Milan, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 345 days.

(21) Appl. No.: 13/165,999

(22) Filed: Jun. 22, 2011

(65) Prior Publication Data

US 2012/0219435 A1    Aug. 30, 2012

Related U.S. Application Data

(60) Provisional application No. 61/446,157, filed on Feb. 24, 2011, provisional application No. 61/446,173, filed on Feb. 24, 2011.

(51) Int. Cl.
| | | |
|---|---|---|
| F04B 39/00 | (2006.01) | |
| F04B 53/00 | (2006.01) | |
| F04B 23/00 | (2006.01) | |
| F04B 17/00 | (2006.01) | |
| F04B 35/04 | (2006.01) | |
| F16D 13/72 | (2006.01) | |
| F16D 13/74 | (2006.01) | |
| F16D 25/12 | (2006.01) | |

(52) U.S. Cl.
USPC ............ 417/313; 417/410.1; 192/85.61; 192/85.63

(58) Field of Classification Search
USPC ............ 417/313, 410.1; 475/136, 159, 160; 192/85.61, 85.63
See application file for complete search history.

(56) References Cited

U.S. PATENT DOCUMENTS

| | | | | |
|---|---|---|---|---|
| 4,514,147 A | * | 4/1985 | Borman et al. | 417/288 |
| 5,234,091 A | * | 8/1993 | Kobayashi et al. | 192/85.49 |
| 5,513,732 A | * | 5/1996 | Goates | 192/3.3 |
| 5,802,490 A | * | 9/1998 | Droste | 701/51 |
| 6,044,645 A | * | 4/2000 | Greenan et al. | 60/337 |
| 6,695,748 B2 | * | 2/2004 | Kopec et al. | 477/130 |
| 6,913,558 B2 | * | 7/2005 | Mori et al. | 477/3 |
| 6,964,631 B2 | * | 11/2005 | Moses et al. | 477/3 |
| 2006/0005647 A1 | * | 1/2006 | Braford et al. | 74/335 |
| 2007/0098567 A1 | * | 5/2007 | Johnson et al. | 417/199.1 |
| 2011/0166727 A1 | * | 7/2011 | Light et al. | 701/22 |

FOREIGN PATENT DOCUMENTS

WO    WO2010/142042    * 12/2010

* cited by examiner

*Primary Examiner* — Devon Kramer
*Assistant Examiner* — Lilya Pekarskaya
(74) *Attorney, Agent, or Firm* — James Dottavio; MacMillan, Sobanski & Todd, LLC (57) ABSTRACT

A pumping system for an automatic transmission includes a valve body containing transmission fluid having an upper level, a hydraulic pump mounted on a wall of the valve body, and an electric motor driveably connected to the pump.

18 Claims, 10 Drawing Sheets

| CLUTCH/SOLENOID APPLICATION CHART ||||||||||
|---|---|---|---|---|---|---|---|---|---|
| GEAR | A | B | C | D | E | F | SS1 | TCC | OWC |
|  | C1-5 | C37R | C28 | CBR1 | C5-8 | C46 |  |  |  |
| P |  |  |  | (X) |  |  |  |  |  |
| R |  | X |  | X |  |  | L |  |  |
| N |  |  |  | (X) |  |  |  |  |  |
| N2 |  |  |  |  | (X) |  |  |  |  |
| 1M | X |  |  | X |  |  | X | (M) |  |
| 1 | X |  |  |  |  |  | X | (M) | X |
| 2 | X |  | X |  |  |  | X | (M) | O/R |
| 3 | X | X |  |  |  |  | X | (M) | O/R |
| 4 | X |  |  |  |  | X | X | (M) | O/R |
| 5 | X |  |  |  | X |  | X | (M) | O/R |
| 6 |  |  |  |  | X | X | L | (M) | O/R |
| 7 |  | X |  |  | X |  | L | (M) | O/R |
| 8 |  |  | X |  | X |  | L | (M) | O/R |

X CLUTCH APPLIED
(X) CLUTCH MAY BE APPLIED
(M) CLUTCH MAY BE MODULATED
N NEUTRAL STATE WITH CBR1 APPLIED
N2 NEUTRAL STATE WITH C5-8 APPLIED FOR HIGH SPEED ENGAGEMENTS
L MAY BE APPLIED TO INCREASE LUBE FLOW

MOTOR PUMP ASSEMBLY FOR TRANSMISSION VALVE BODY

This application claims priority to and the benefit of U.S. Provisional Application Nos. 61/446,157 and 61/446,173, filed Feb. 24, 2011, the full disclosures of which are incorporated herein by reference.

BACKGROUND OF THE INVENTION

1. Field of the Invention

This invention relates to an automatic transmission for a motor vehicle that includes planetary gearsets and clutches and brakes whose state of engagement and disengagement determines speed ratios produced by the transmission.

2. Description of the Prior Art

In a front wheel drive vehicle, the axial space available for the transmission is limited by the width of the engine compartment and the length of the engine. In addition, the trend to increase the number of ratios available generally increases the number of components required. For these reasons, it is desirable to position components concentrically in order to minimize axial length. The ability to position components concentrically is limited, however, by the need to connect particular components mutually and to the transmission case.

Furthermore, it is desirable for the output element to be located near the center of the vehicle, which corresponds to the input end of the gear box. An output element located toward the outside of the vehicle may require additional support structure and add length on the transfer axis. With some kinematic arrangements, however, the need to connect certain elements to the transmission case requires that the output element be so located.

SUMMARY OF THE INVENTION

A pumping system for an automatic transmission includes a valve body containing transmission fluid having an upper level, a hydraulic pump mounted on a wall of the valve body, and an electric motor driveably connected to the pump.

An electric motor is mounted within a valve body above the elevation of the oil level in the valve body, such that the motor is not submerged in the oil. The rotor of a hydraulic pump runs against a separator plate. No seal is required between the motor and pump.

The motor is vented to atmosphere, thereby improving operating efficiency of the E-pump system.

The motor driven pump increases the flow rate of transmission to the lube circuit through an oil cooler, thereby increasing the flow rate through the lube circuit and reducing the temperature of transmission fluid and supplying greater lubrication during periods of high torque, such as when the vehicle is towing a heavy load.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a schematic side view of a multiple speed automatic transaxle, showing the relative relationship of the portions of the transaxle shown in FIGS. 1 A, 1B and 1 C;

FIG. 1 A is a cross sectional side view of a portion of the multiple speed automatic transaxle, showing the leftmost portion of the view in FIG. 1;

DESCRIPTION OF THE PREFERRED EMBODIMENT

Figures 1, 1A:
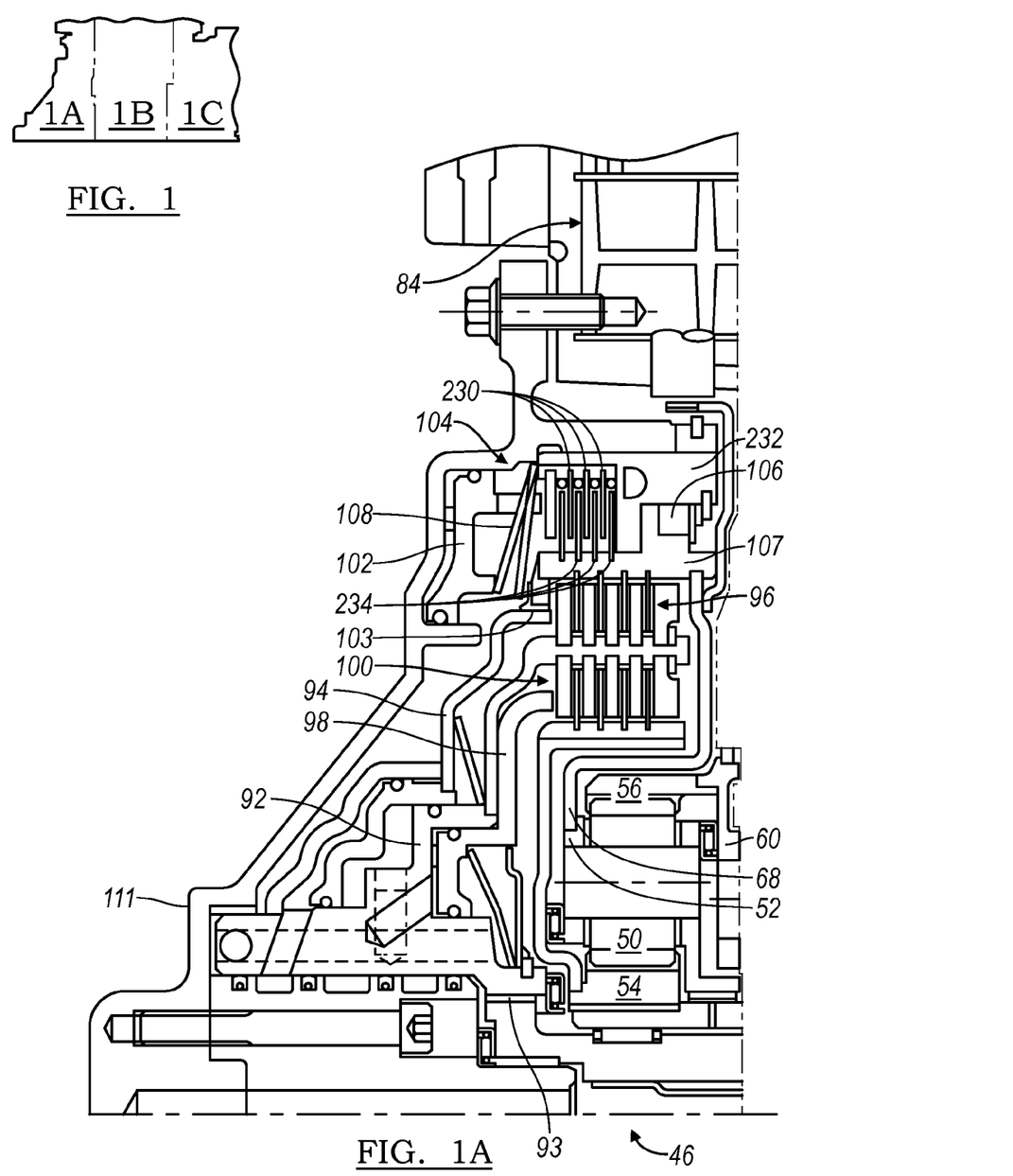
Figure 1B:
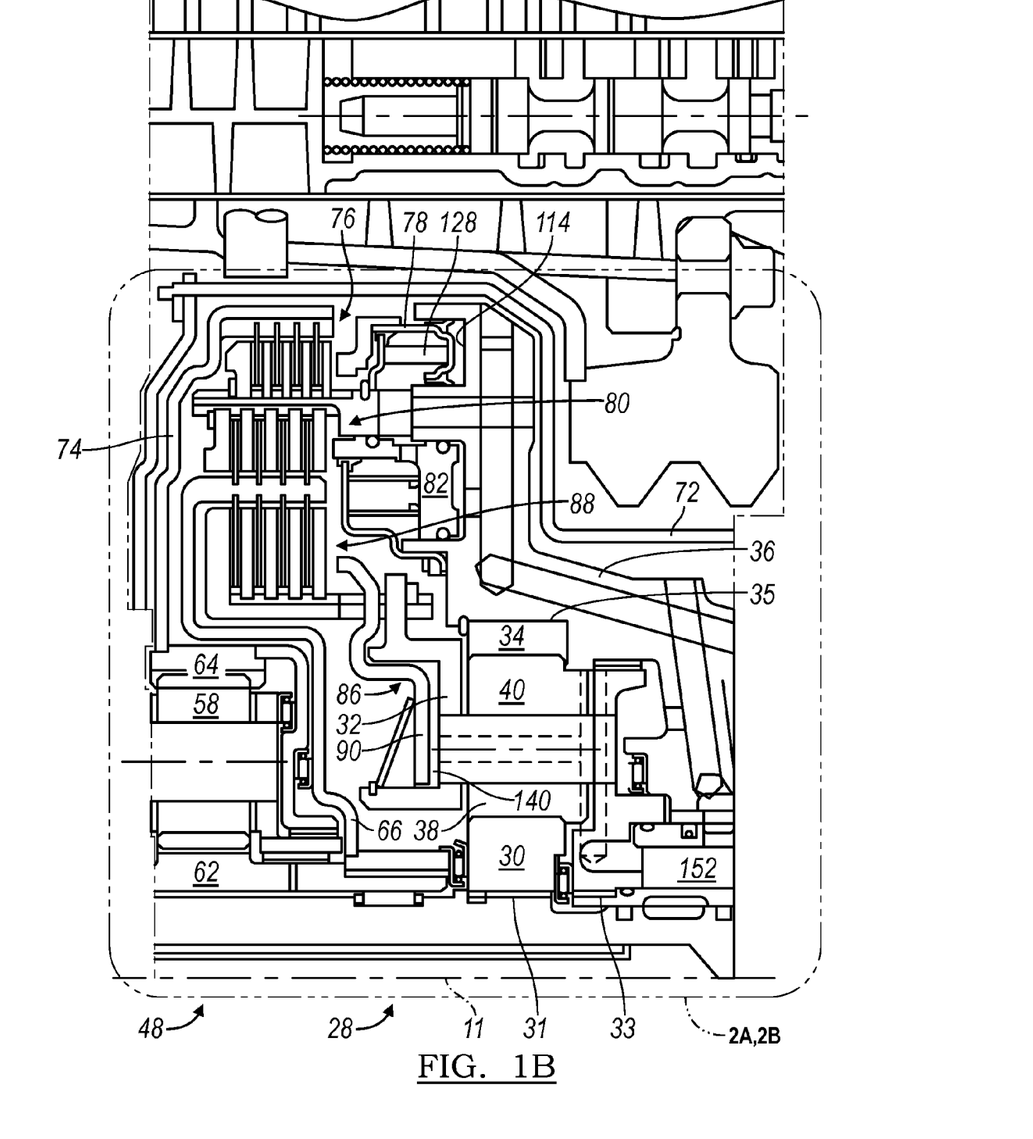
FIG. 1B is a cross sectional side view of a portion of the multiple speed automatic transaxle, showing the middle portion of the view in FIG. 1.
Figure 1C:
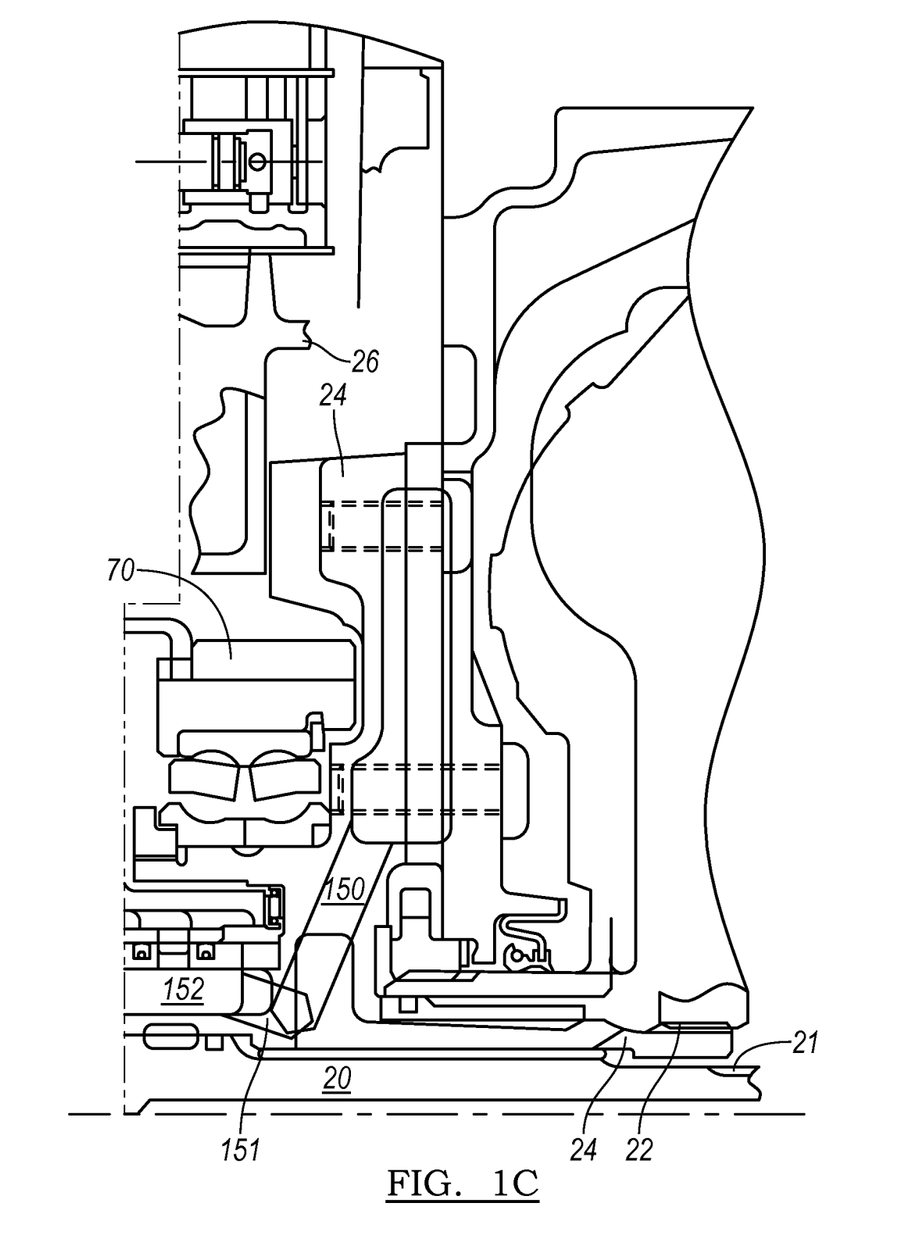
FIG. 1C is a cross sectional side view of a portion of the multiple speed automatic transaxle, showing the rightmost portion of the view in FIG. 1.

Referring now to the drawings, FIG. 1 illustrates gearing, clutches, brakes, shafts, fluid passages, and other components of a multiple-speed automatic transaxle arranged substantially concentrically about an axis 11.

A torque converter includes an impeller driven by an engine, a turbine hydrokinetically coupled to the impeller, and a stator between the impeller and turbine. A transmission input shaft 20 is secured by a spline connection 21 to the turbine. The stator is secured by a spline connection 22 to a front support 24, which is secured against rotation to a transmission case 26.

A double pinion, speed reduction planetary gearset 28 includes a sun gear 30, secured by a spline connection 31 to input shaft 20; a carrier 32, secured by a spline connection 33 to the front support 24; a ring gear 34, secured by a spline connection 35 to a front cylinder assembly 36; a first set of planet pinions 38 supported on carrier 32 and meshing with sun gear 30; and a second set of planet pinions 40, supported on carrier 32 and meshing with ring gear 34 and the first pinions 38. Ring gear 34 rotates in the same direction as input shaft 20 but at a reduced speed.

Rear gearset 46 and middle gearset 48 are simple planetary gearsets. Gearset 46 includes a set of planet pinion 50 supported for rotation on carrier 52 and meshing with both sun gear 54 and ring gear 56. Gearset 48 includes a set of planet pinions 58 supported for rotation on carrier 60 and meshing with both sun gear 62 and ring gear 64. Sun gear 54 is splined to a shaft that is splined to a shell 66, on which shaft sun gear 62 is formed, thereby securing the sun gears 54, 62 mutually and to the shell 66. Carrier 52 is fixed to a shell 68. Carrier 60 and ring gear 56 are fixed to each other and to output pinion 70 through a shell 72. Ring gear 64 is fixed to shell 74.

Front cylinder assembly 36, which is fixed to ring gear 34, actuates clutches 76, 80. Plates for clutch 76 includes plates splined to front cylinder assembly 36 alternating with plates splined to shell 74. When hydraulic pressure is applied to piston 78, the plates are forced together and torque is transmitted between ring gears 34 and 64. When the hydraulic pressure is released, ring gears 34 and 64 may rotate at different speeds with low parasitic drag. Similarly, plates for clutch 80 include plates splined to front cylinder assembly 36 alternating with plates splined to shell 66. When hydraulic pressure is applied to piston 82, torque is transmitted between ring gear 34 and sun gears 54, 62. Pressurized fluid is routed from a control body 84, through front support 24, into front cylinder assembly 36 between rotating seals.

Middle cylinder assembly 86, which includes carrier 32, actuates brake 88. Plates for brake 88 include plates splined to carrier 32 alternating with plates splined to shell 66. When hydraulic pressure is applied to piston 90, the brake holds sun gears 54, 62 against rotation. Pressurized fluid is routed from the control body 84, through case 26 to front support 24, between planet pinions 38, 40, into middle cylinder assembly 86. Due to the location of clutch pack 88, output element 70 is located in the more favorable position near the front of the gear box.

Rear cylinder assembly 92 is secured by a spline connection 93 fixed to input shaft 20. When hydraulic pressure is applied to piston 94, the plates of clutch 96 transmit torque between input shaft 20 and carrier 52. Similarly, when hydraulic pressure is applied to piston 98, the plates of clutch 100 transmit torque between input shaft 20 and sun gears 54, 62. Pressurized fluid is routed from the control body 84, through case 26 and cover 111 into rear cylinder assembly 92.

When hydraulic pressure is applied to piston 102, brake 104 holds carrier 52 and shell 68 against rotation. A one-way brake 106 passively prevents carrier 52 and shell 68 from rotating in the negative direction, but allows them to rotate in the forward direction. One-way brake 106 may optionally be omitted and its function performed by actively controlling brake 104.

The D brake 104 is used only as a latching device not as a dynamic brake. To minimize parasitic viscous drag loss produced in brake 104 it is desired that excess oil not be present in the brake. Therefore, an oil dam formed by an oil seal 103 between the piston 94 of E clutch 96 and the inner race 107 of one-way brake 106 is provided to limit or prevent oil from entering the D brake 104. The inner radial end of return spring 108 continually contacts the piston 102 that actuates brake 104. The outer radial end of return spring 108 continually contacts a fixed structure, so that the spring flexes as the piston 102 moves in the cylinder of the D brake 104. In this way, return spring 108 also participates in the oil dam by limiting or preventing radial flow of oil into the D brake 104 caused by centrifugal force.

This arrangement permits brake 88 and clutches 76, 80 to be mutually concentric, located at an axial plane, and located radially outward from the planetary gearsets 28, 46, 48 such that they do not add to the axial length of the gearbox. Similarly, clutches 96, 100 and brake 104 are mutually concentric and located radially outward from the planetary gearing 28, 46, 48. Clutches 76, 80, 96, 100 and brakes 88, 104, 106 comprise the control elements.

Figure 2A:
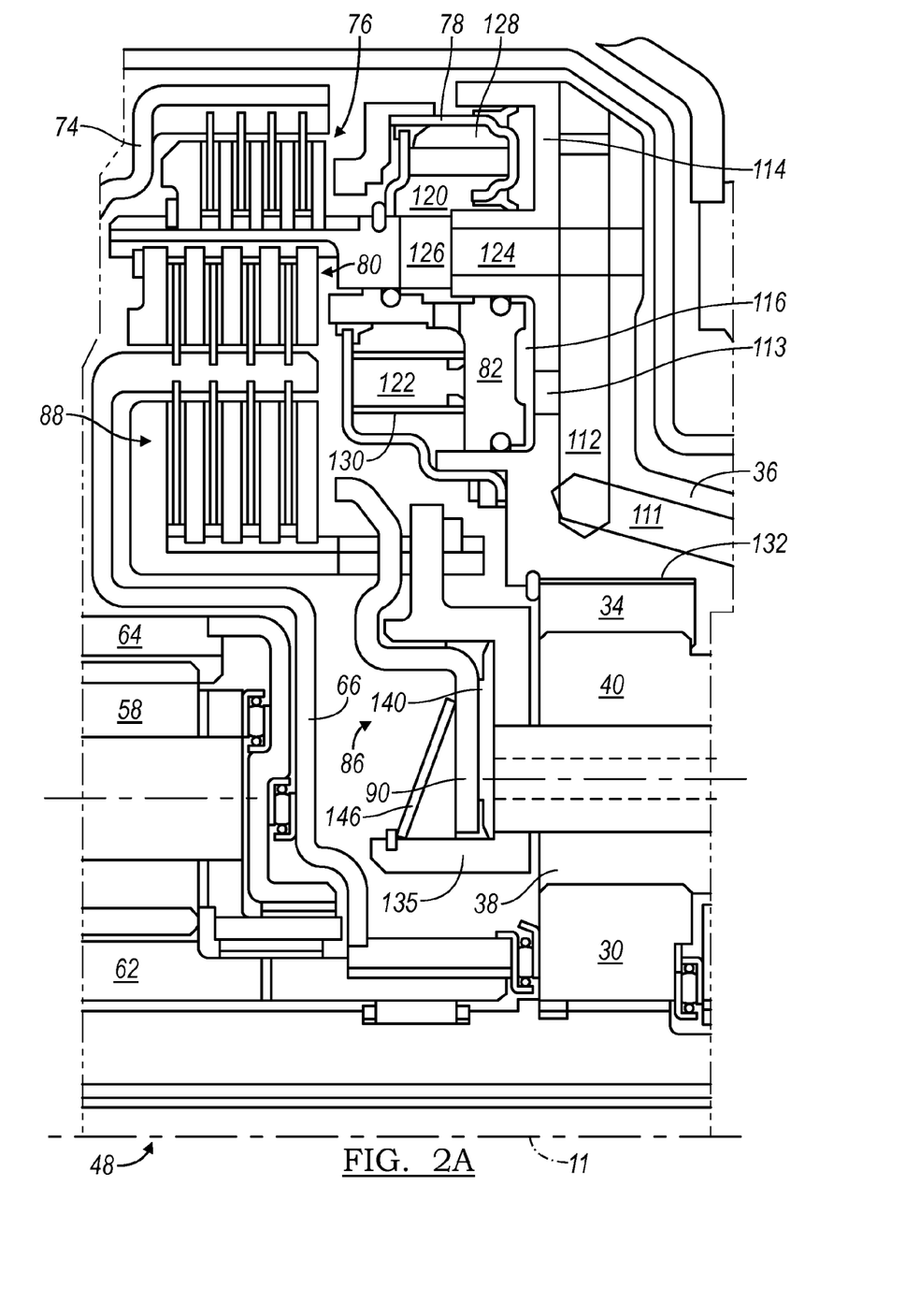
FIGS. 2A and 2B are a cross sectional side view of a portion of the transaxle showing the front and middle cylinder assemblies, taken from encircled area 2A, 2B in FIG. 1 B.
Figure 2B:
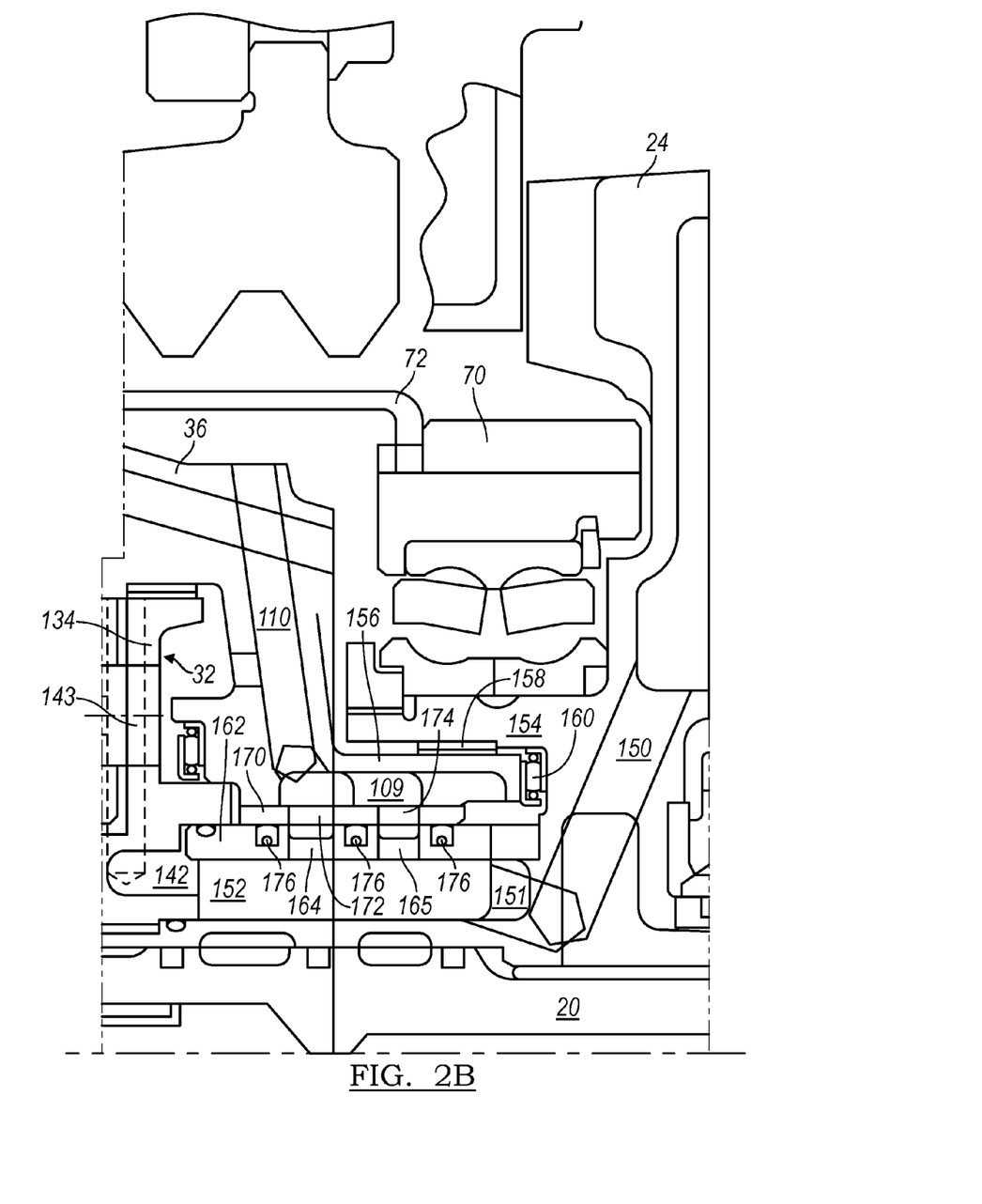

As FIGS. 2A, 2B illustrate, the front cylinder assembly 36 is supported for rotation on the fixed front support 24 and carrier 34. The front cylinder assembly 36 is formed with clutch actuation fluid passages, each passage communicating with one of the cylinders 114, 116 formed in the front cylinder assembly 36. Cylinder 114 contains piston 78; cylinder 116 contains piston 82. One of the fluid passages in front cylinder assembly 36 is represented in FIG. 2 by interconnected passage lengths 109, 110, 111, 112, through which cylinder 116 communicates with a source of clutch control hydraulic pressure. Another of the fluid passages in front cylinder assembly 36, which is similar to passage lengths 109, 110, 111, 112 but spaced angularly about axis 11 from passage lengths 109, 110, 111, 112, communicates a source of clutch control hydraulic pressure to cylinder 114. Passage lengths 109 are machined in the surface at the inside diameter of the front cylinder assembly 36.

The front cylinder assembly 36 is also formed with a balance volume supply passage, similar to, but spaced angularly about axis 11 from passage lengths 109, 110, 111, 112. The balance volume supply passage communicates with balance volumes 120, 122. As shown in FIG. 2A, the balance volume supply passage includes an axial passage length 124, which communicates with a source of balance volume supply fluid and pressure, and a radial passage length 126, through which fluid flows into the balance volumes 120, 122 from passage 124. Passage 124 may be a single drilled hole extending along a longitudinal axis and located between the two clutch balance areas of the A clutch and B clutch. Passage 124 carries fluid to cross drilled holes 126, which communicate with the balance volumes 120, 122.

Coiled compression springs 128, 130, each located in a respective balance dam 120, 122, urge the respective piston 78, 82 to the position shown in FIG. 2. Ring gear 34 is secured to front cylinder assembly 36 by a spline connection 132.

Middle cylinder assembly 86 includes carrier 32, which is grounded on the front support 24. Carrier 32 includes first and second plates 134, 135 and pinion shafts secured to the plates, one pinion shaft supporting pinions 38, and the other pinion shaft supporting pinions 40. Plate 135 is formed with a cylinder 140 containing a brake piston 90.

A source of brake actuating hydraulic pressure communicates with cylinder 140 through a series on interconnected passage lengths 142, 143 and a horizontal passage length that extends axially from passage 143, through a web of carrier 32, between the sets of planet pinions 38, 40, to cylinder 140. These brake feed passages are formed in carrier 32. When actuating pressure is applied to cylinder 140, piston 90 forces the plates of brake 88 into mutual frictional contact, thereby holding sun gears 54, 62 and shell 66 against rotation. A Belleville spring 146 returns piston 90 to the position shown in FIG. 2, when actuating pressure is vented from cylinder 140.

The front support 24 is formed with passages, preferably spaced mutually about axis 11. These passages in front support 24 are represented in the FIGS. 1 and 2 by passage lengths 150, 151, 152, through which hydraulic fluid is supplied to clutch servo cylinders 114, 116, brake servo cylinder 140, and balance dams 120, 122. A passage of each of the front support passages communicates hydraulic fluid and pressure to cylinders 114, 116 and balance dams 120, 122 of the front cylinder assembly 36 through the fluid passages 109, 110, 111, 112, 113, 124 formed in the front cylinder assembly 36. Another passage of each of the front support passages communicates hydraulic fluid and pressure to cylinder 140 of the middle cylinder assembly 86 through the fluid passages 142, 143 in carrier 32.

The front support 24 includes a bearing support shoulder 154, which extends axially and over an axial extension 156 of the front cylinder assembly 36. A bushing 158 and bearing 160 provide for rotation of the front cylinder assembly 36 relative to the front support 24. This arrangement of the front support 24, its bearing support shoulder 154, and front cylinder assembly 36, however, prevents radial access required to machine a passage or passages that would connect first passage 152 in front support 24 to the second passage 109 in the front cylinder assembly 36.

To overcome this problem and provide hydraulic continuity between passage lengths 109, 152, first passage 152 is formed with an opening that extends along a length of first passage 152, parallel to axis 11, and through an outer wall of the front support 24. The opening faces radially outward toward second passage 109. Similarly, second passage 109 is formed with a second opening that extends along a length of second passage 109, parallel to axis 11, and through an inner wall of the front cylinder assembly 36. The second opening faces radially inward toward first passage 152.

A first sleeve 162 is inserted axially with a press fit over a surface at an outer diameter of the front support 24, thereby covering the opening at the outer surface of passage length 152. Sleeve 162 is formed with radial passages 164, 165, which extend through the thickness of the sleeve 162. Seals 176, located at each side of the passages 164, 165 prevent leakage of fluid from the passages.

A second sleeve 170 is inserted axially with a press fit over the second opening at the inside diameter of the front cylinder assembly 36, thereby covering and enclosing the length of the second opening in the second passage 109. Sleeve 170 is formed with radial openings, two of which are represented in FIG. 2 by openings 172, 174, aligned with the radial passages 164, 165 formed in the first sleeve 162.

Sleeves 164 and 170 provides hydraulic continuity from the source of fluid pressure carried in the passages of the front support 24 to the balance dams 120, 122 and the servo cylinders 114, 116, 140, through which clutches 76, 80 and brake 88 are actuated.

Figure 3:
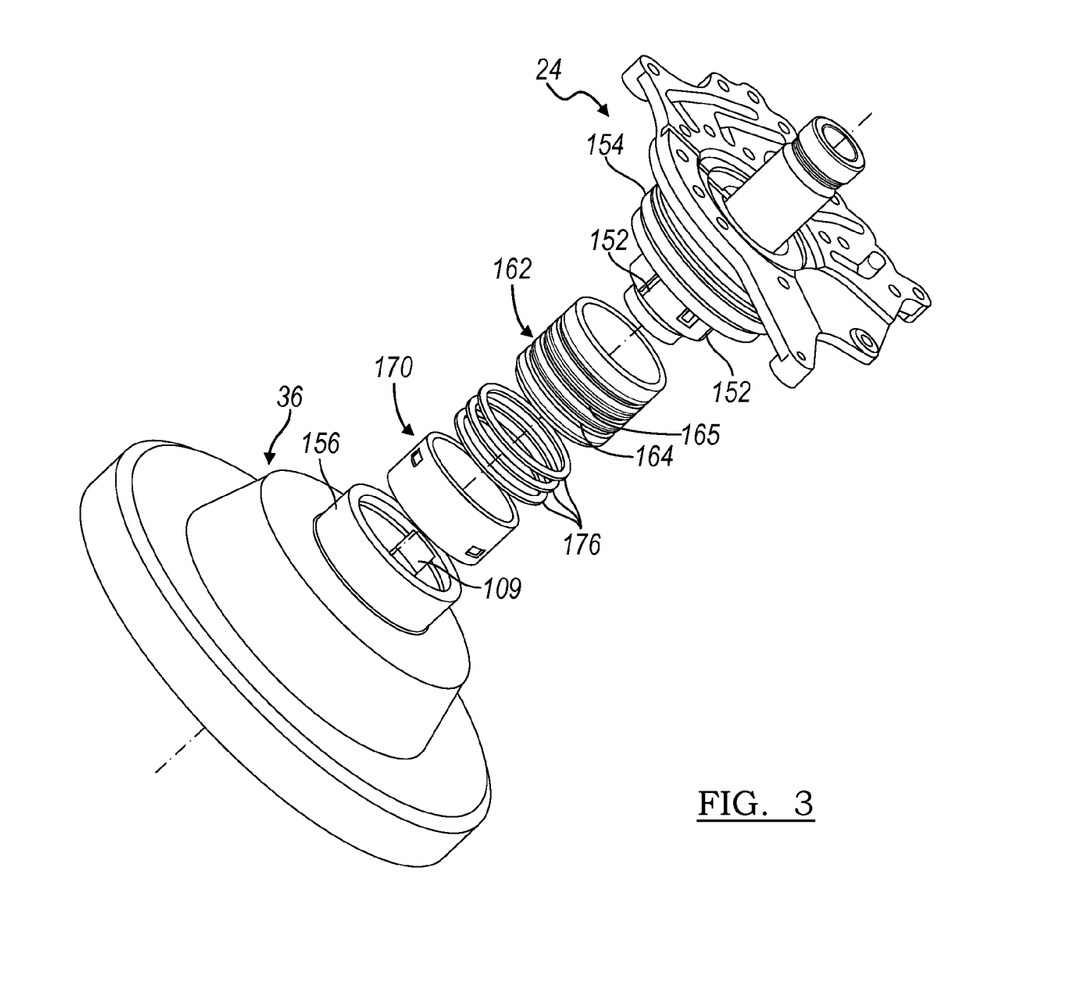
FIG. 3 is a side perspective view showing sleeves that are fitted on the front support and middle cylinder assembly, respectively.

Sleeves 162, 170 also provide access that enables machining of the first and second passages 152, 109 in the surface at the outside diameter of front support 24 and in the surface at the inside diameter of the front cylinder assembly 36. FIG. 3 shows sleeves 162, 170 and three seals 176, which are fitted in recesses on sleeve 162 between each of its radial passages 164, 165.

Figure 4:
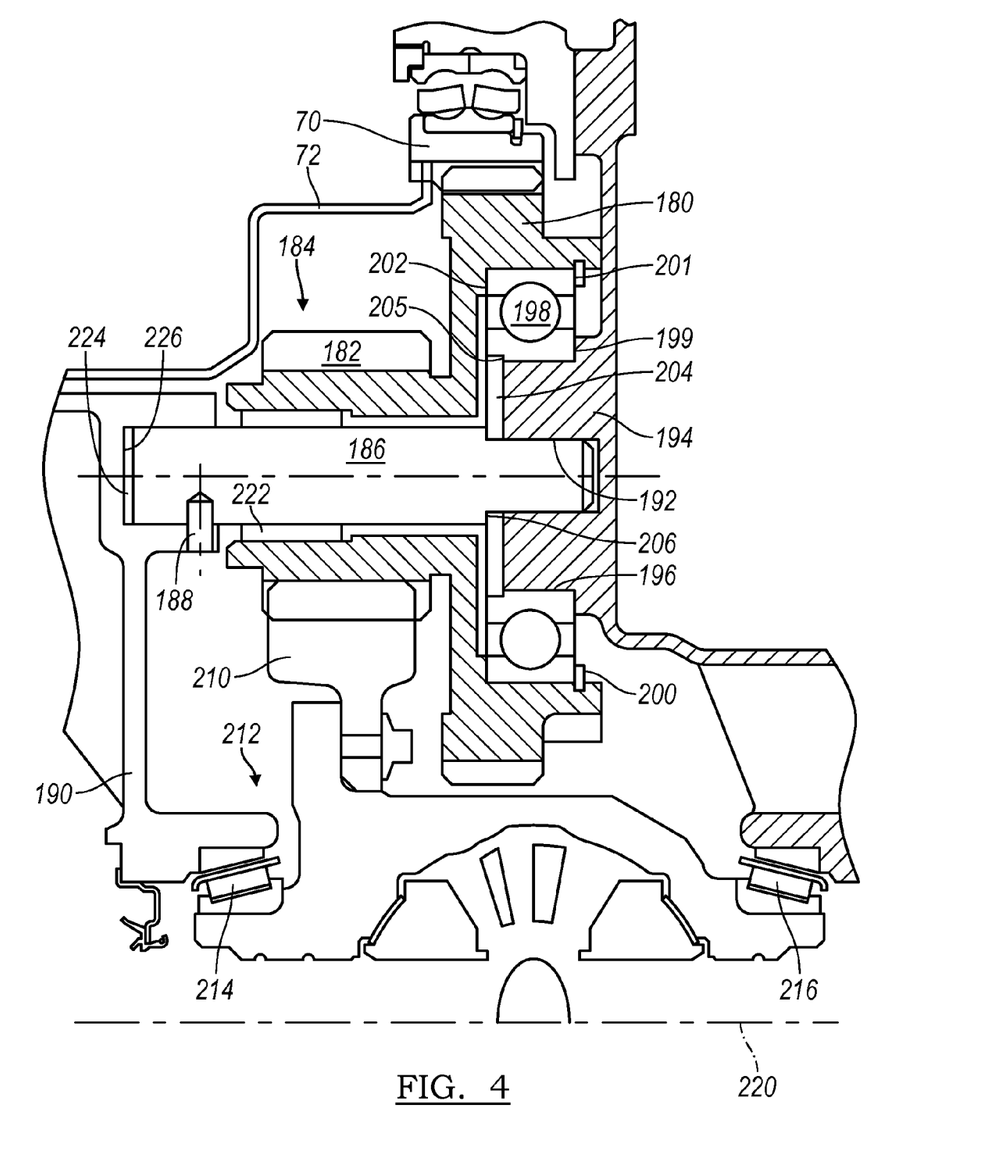
FIG. 4 is a view cross sectional side view of the transfer gears and shaft near the output of the transaxle of FIG. 1.

As FIG. 4 shows output pinion 70 meshes with a transfer gear 180, which is formed integrally with transfer pinion 182 on a transfer wheel 184. A transfer shaft 186, is secured at one end by a pinned connection 188 to a non-rotating housing component 190, and at the opposite end is seated in a recess 192 formed in a non-rotating torque converter housing component 194. Ball bearing 198 supports transfer wheel 184 on the torque converter housing 194. Housing components 190, 194 comprise a reaction component and may be formed integrally or preferably as separate components.

Ball bearing 198 is supported radially by being seated on a surface 196 of the torque converter housing 194. A shoulder 199 on torque converter housing 194 contacts the right-hand axial surface of the inner race of bearing 198, the second surface of bearing 198. A snap ring 200 contacts the right-hand axial third surface 201 of the outer race of bearing 198. Shoulder 199 and snap ring 200 limit rightward axial movement of bearing 198.

A shoulder 202 formed on gear wheel 184 contacts the left-hand axial first surface of the outer race of bearing 198. A thrust washer 204 contacts a left-hand axial fourth surface 205 of the inner race of bearing 198. The thrust washer 204 contacts a shoulder 206 formed on transfer shaft 186. Shoulders 202 and 206 limit leftward axial movement of bearing 198.

The ring gear 210 of a differential mechanism 212 meshes with transfer pinion 182 and is supported for rotation by bearings 214, 216 on housing 190, 194. Rotating power transmitted to output pinion 70 is transmitted through transfer gears 180, 182 and ring gear 210 to the input of differential, which drives a set of vehicle wheels aligned with axis 220.

A roller bearing 222 supports transfer wheel 184 on transfer shaft 186. The thickness of a washer 224, fitted in a recess 226 of housing 190, is selected to ensure contact between thrust washer 204 and the inner race of bearing 198.

The output pinion 70 and transfer gears 180, 182 have helical gear teeth, which produce thrust force components in the axial direction parallel to axis 220 and in the radial direction, normal to the plane of FIG. 4. A thrust force in the right-hand direction transmitted to the transfer gear wheel 184 is reacted by the torque converter housing 194 due to its contact at shoulder 199 with bearing 198. A thrust force in the left-hand direction transmitted to the transfer gear wheel 184 is reacted by the housing 190 due to contact between snap ring 200 and bearing 198, contact between bearing 198 and thrust washer 204, contact between the thrust washer and transfer shaft 186, and contact between shaft 186, washer 224 and housing 190.

As shown in FIG. 1A, the D brake 104 includes a first set of thin discs 230 secured to the outer race 232 of one-way brake 106 by a spline connection, which permits the discs 230 to move axially and prevents them from rotating relative to the race 232, which is fixed to the transmission case or end cover against rotation.

Similarly, the D brake 104 includes a second set of thin discs 234 secured to the inner race 107 of one-way brake 106 by a spline connection, which permits the discs 234 to move axially and prevents them from rotating relative to the inner race 107. Inner race 107 is fixed to the carrier 68 of gearset 46, such that they rotate together as a unit at the same speed. Preferably the outer and inner races 232, 107 of one-way brake 106 are formed of a ferrous alloy of sintered powdered metal, and discs 230, 234 are of steel. Preferably the one-way brake 106 is a rocker one-way brake of the type having a pivoting rockers, each rocker retained is a pocket and actuated by centrifugal force and a compression spring, as described in U.S. Pat. Nos. 7,448,481 and 7,451,862.

The reaction spline for the D clutch 104 is preferably not formed in the aluminum case or end cover because of high local stresses caused by the thin discs 232, 234 used to reduce parasitic loss. The D clutch reaction splines are formed as an integral part of the raceways of the one-way brake 106. The brake 106 is then splined to the transmission case.

Figure 5:
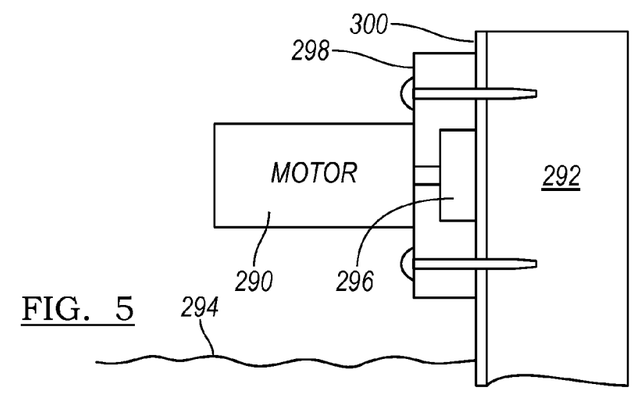
FIG. 5 is a side view showing a motor mounted within valve body and above the elevation of the oil level in the valve body.

FIG. 5 is a side view showing an electric motor 290, preferably a brushless motor, mounted within an inner valve body 292 and above the elevation 294 of the oil level in the valve body 292, such that the motor is not submerged in the oil. The rotor 296 of a hydraulic pump 298 runs against a separator plate 300. No seal is required between the motor 290 and pump 298. Due to its elevation the motor 290 is vented to atmosphere, thereby improving the operating efficiency of the electrically driven pump, sometimes called an E-pump. The inlet of pump 298 is connected to a source of filtered automatic transmission fluid (ATF), i.e., oil.

Figure 6:
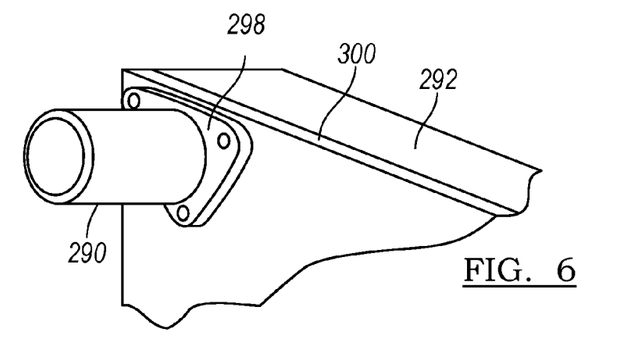
FIG. 6 is a perspective view of the motor secured to a separator plate on the valve body.

FIG. 6 is a perspective view of the motor 290 and pump 298 secured through the separator plate 300 to the valve body 292.

Figure 7:
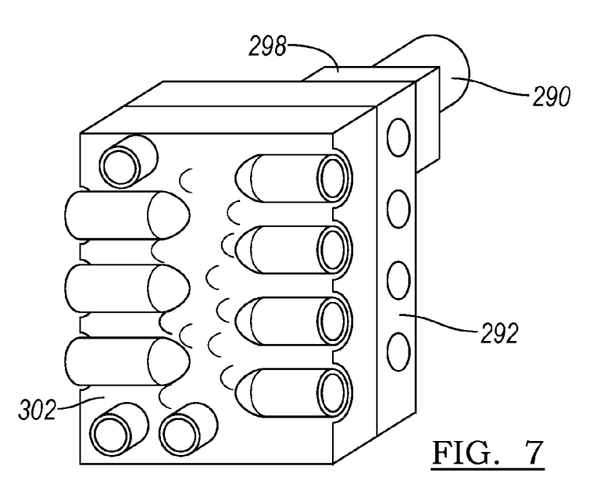
FIG. 7 is a perspective view showing the outer valve body, inner valve body, and the motor mounted on the inner valve body

FIG. 7 is a perspective view showing an outer valve body 302, which contains solenoids, located adjacent the inner valve body 292, which contains valves that are actuated by the solenoids to control operation of the transmission.

Figure 8:
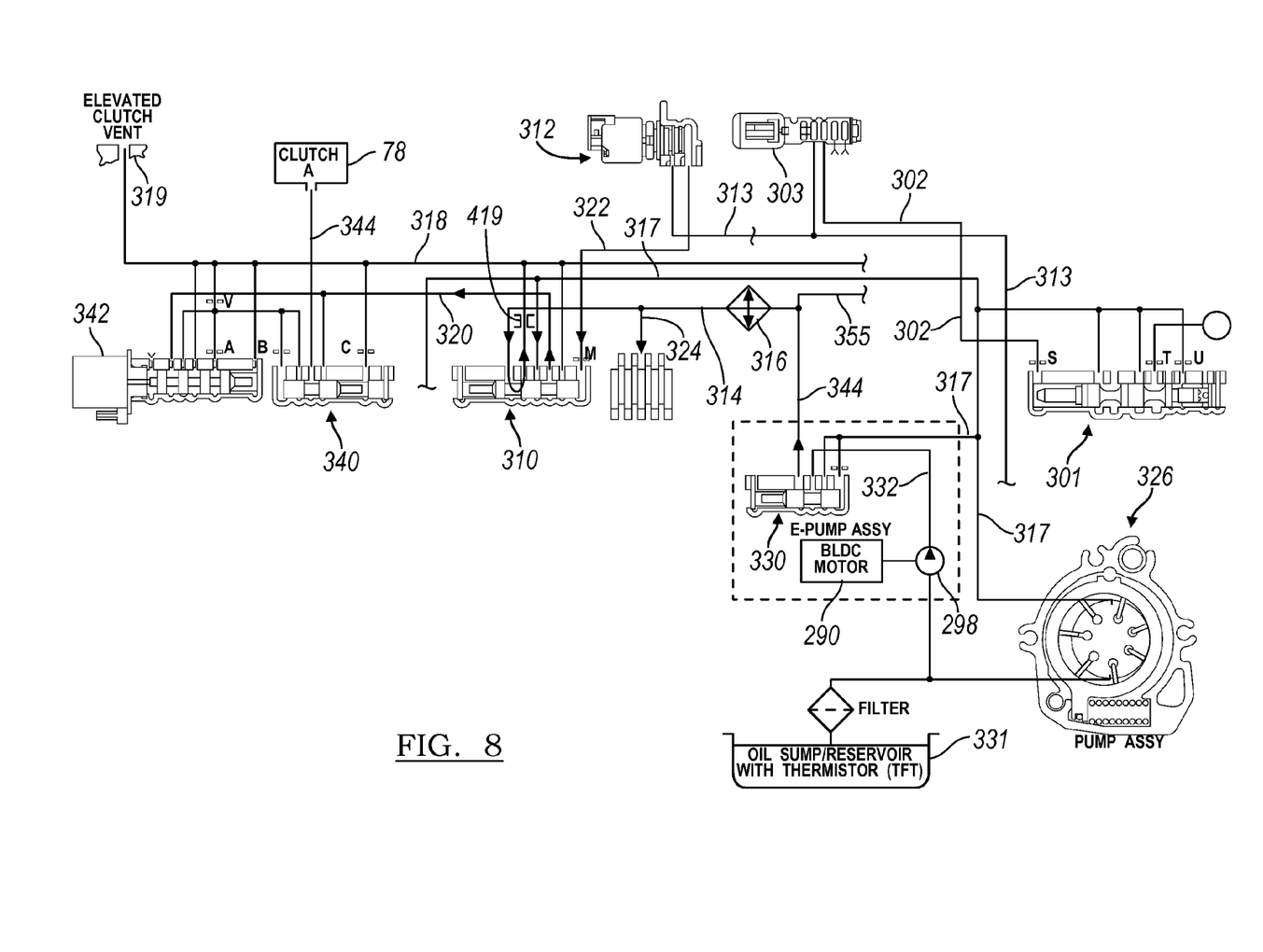
FIG. 8 is a schematic diagram of a hydraulic control circuit for the transmission.

Referring now to FIG. 8, the hydraulic circuit includes a cut-off lube control valve 310; a SS1 solenoid-operated valve 312, which responds to solenoid feed pressure in line 313; a source cooled clutch feed fluid 314 connected to an oil cooler 316; a source of line pressure 317 produced by an engine-driven pump 326; a lube line 324 connecting valve 310 to an elevated clutch vent 319 at an oil sump; a line 320 that feeds oil to a clutch, such as A clutch 78; and a line 322 carrying pressure from valve 312 to valve 310.

Regulated line pressure LP is carried in line 317. Output from pump 326 is supplied to a main oil pump valve 301, which regulates line pressure in response to a line pressure control signal LPC carried in line 302 to valve 301 from a solenoid-operated LPC valve 303. Solenoid pressure SF is carried in line 313 from a source of solenoid pressure, i.e., the output a variable displacement solenoid—actuated valve, to the line pressure control solenoid valve 303 and to SS1 valve 312.

When pressure in line 322 from SS1 valve 312 is high, the spool of valve 310 moves against the force of its compression spring to the left-hand end of its valve chamber, thereby connecting line 317 to line 320, which carries pressure to A clutch 78. Clutch feed pressure is carried in line 317 to the six control elements, i.e., the clutches and brakes from a source of clutch feed pressure. Line 314 carries ATF to the lube circuit 324, which supplies the balance dams 120, 122, and balance dams in clutches 96 and 100.

When pressure in line 322 from valve 312 is low, valve 310 shuttles to the right-hand end of the valve chamber, thereby connecting line 314 and line 318. An orifice can be used to control the flow rate in line 318 to the sump 331 from valve 310.

Generally the lube flow rate is set at a rate required to maximize the service life of the clutches, brakes, gears and bearings due to a maximum torque condition. This flow rate, however, is greater than that required for normal driving conditions. Valve 310 provides both a lube path, in which lubricant can flow to cool and lubricate the clutches, brakes, gears and bearings and a parallel path to the sump 331.

The hydraulic circuit supplies filtered ATF drawn from sump 331 to an auxiliary pump 298, driven by brushless motor 290. When the vehicle includes an automated start-stop function, which automatically stops the engine at a traffic light or when no torque is demanded and automatically restarts the engine when torque is demanded, the auxiliary pump valve 330 is supplied through pump 298 and line 332 with ATF from sump 331.

In operation, when regulated line pressure in line 317 is high, valve 330 shuttles to the left-hand end of its chamber, thereby connecting fluid in line 332 from the E-pump 298 to line 344, oil cooler 316, line 314 and lube circuit 324.

When line pressure in line 318 is low, the spool of valve 330 moves to the right-hand end of its chamber, thereby disconnecting the outlet of pump 298 from line 344, cooler 316 and lube circuit 313 and connecting circuit 332 to line pressure circuit 317.

In this way, when the engine is running, the engine-driven hydraulic pump 326 is running, and regulated line pressure is high, AFT from E-pump 298 increases the ATF flow rate to the cooler 316, thereby helping to reduce the temperature of ATF in the hydraulic circuit, and to lube circuit 324, thereby increasing the flow of lubricant that lubricates the transmission. This operation of the E-pump 298 and motor 290 can occur, without limitation, when the vehicle is towing a heavy load, or immediately following a high engine torque condition, or whenever ATF temperature is high, and combination of these conditions.

An automatic transmission conventionally includes a manual valve, which is moved by a cable in response to manual movement of the gear selector to the selected range position. Shift-by-wire and range-by-wire selector systems usually have no manual valve. The range-by-wire system of this transmission therefore requires some means to protect against energizing a solenoid or engaging a gear that is other than the solenoid or gear corresponding to the selected range.

Figure 9:
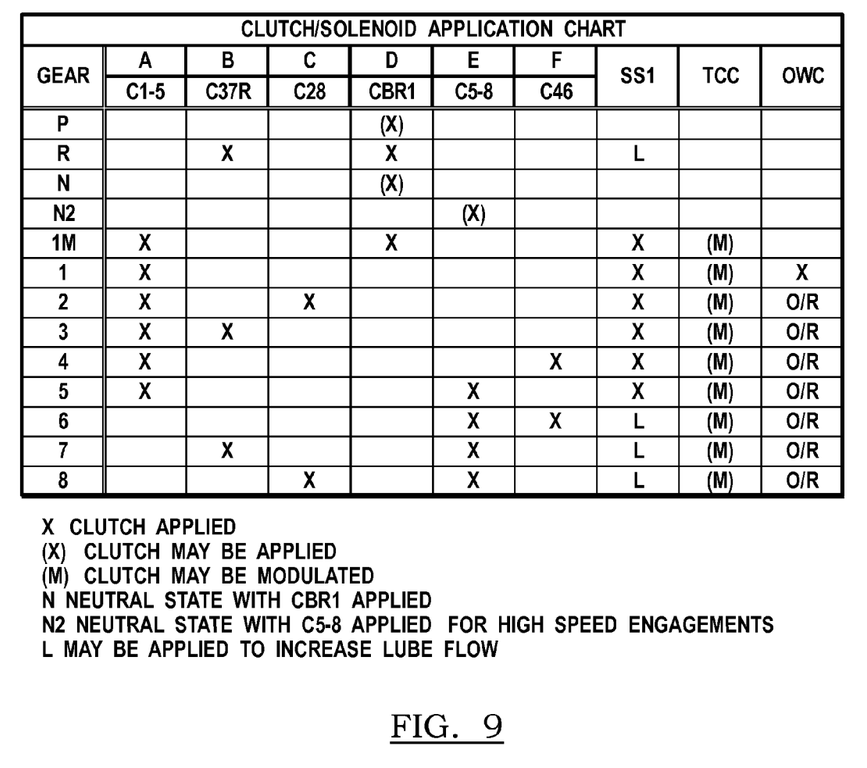
FIG. 9 is a table showing the applied and unapplied states of the clutches, brakes of the transmission and the solenoids of the control circuit of FIG. 8.

When the spool of valve 310 moves to the right-hand end of the chamber due to low pressure from SS1 valve 312 in line 322, line pressure 317 entering at the inlet port of valve 310 is blocked by valve 310, thereby preventing line pressure from being feed through PC1F line 320 to the A clutch 76, and directing clutch feed pressure in CF line 314 through the elevated clutch vent 319 to sump 331. Due to low pressure in line 322, the A clutch 78 is disengaged because no actuating pressure is feed to clutch 78. As indicated in the clutch/solenoid application chart of FIG. 9, the A clutch 78 must be engaged to produce the first through fifth forward gears. Pressure in line 322 is low when the range-by wire system selects a range other than the gears 1 thru 5.

When valve 310 shuttles to the left-hand end of the chamber due to high pressure from SS1 valve 312 in line 322, line pressure in line 317 at the inlet port of valve 310 is connected through valve 310 to PC1F line 320, thereby connecting line pressure to valve 340, which feeds shift control pressure to the A clutch 78 subject to control of PC1 solenoid 342. Also CF line 314 is disconnected from sump 331 through line 318 and vent 319. This action allows the A clutch 76 to engage, thereby enabling each of the first five lowest forward gears to engage as required and allowing a high rate oil flow to the lube circuit 324, due to valve 310 disconnecting line 314 from line 318 to sump 331. Pressure in line 322 is high when the range-by wire system selects the DRIVE range with gears 1 through 5.

Therefore, even without a manual valve and while pressure in SS1 line 322 is low, the first through fifth gear cannot be produced, but reverse drive and sixth, seventh and eighth forward gears can be produced, thereby permitting the vehicle to be driven. In the event of a failure of the ACL in the ON condition, in conjunction with the OWC, the result would be first gear in Neutral and Park, but the cut-off valve 310 can disconnect line pressure in LP line 317 from PC1F line 320 to the A clutch 78 through ACL line 344, allowing the A clutch to disengage and producing no first gear.

In accordance with the provisions of the patent statutes, the preferred embodiment has been described. However, it should be noted that the alternate embodiments can be practiced otherwise than as specifically illustrated and described.

The invention claimed is:

1. A pumping system for an automatic transmission, comprising:
    a regulated source of line pressure from a first pump;
    an electrically-driven second pump;
    a first valve for connecting said source to a transmission clutch;
    a second valve responsive to pressure of said source for connecting the second pump to balance dams and a lube circuit, disconnecting the second pump from said balance dams and lube circuit and connecting the second pump to said source.

2. The system of claim 1, further comprising an electric motor is located at a higher elevation than a oil level of fluid in a valve body and driveably connected to the second pump.

3. The system of claim 1, wherein the first pump includes an inlet communicating with a sump containing transmission fluid.

4. The system of claim 1, further comprising:
a sump for supplying transmission fluid to an inlet of the first pump.

5. The system of claim 1, further comprising an oil cooler through which fluid flows from the second valve to the lube circuit.

6. The system of claim 1, wherein the first valve, in responsive to a control pressure, disconnects said source from the transmission clutch and connects said source to a sump.

7. A pumping system for an automatic transmission, comprising:
a source of regulated line pressure;
an electric motor driveably connected to a first pump;
a first valve for connecting said source to a transmission clutch;
a second valve responsive to pressure of said source for connecting a second pump to balance dams and a lube circuit, and for disconnecting the second pump from said balance dams and lube circuit and connecting the second pump to said source.

8. The system of claim 7, wherein the second valve disconnects an outlet of the second pump from the balance dams and lube circuit when pressure from said source is relatively low, and the second valve connects the outlet of the second pump to the balance dams and lube circuit when pressure from said source is relatively high.

9. The system of claim 7, wherein the electric motor is located at a higher elevation than an oil level of fluid in a valve body on which the electic motor is supported.

10. The system of claim 7, wherein the second pump includes an inlet communicating with a sump containing transmission fluid.

11. The system of claim 7, further comprising an oil cooler through which fluid flows from the second valve to the lube circuit.

12. The system of claim 7, wherein the first valve, in responsive to a control pressure, disconnects said source from the transmission clutch and connects said source to a sump.

13. A pumping system for an automatic transmission, comprising:
a valve body containing fluid having an oil level;
a first pump producing a source of line pressure;
a regulated source of line pressure;
a second pump mounted on the valve body;
an electric motor driveably connected to the second pump;
a first valve responsive to a control pressure for connecting said source to a transmission clutch and for disconnecting said source from the transmission clutch and connecting said source to a sump;
a second valve responsive to pressure of said source connecting the second pump to balance dams and a lube circuit, alternately disconnecting the second pump from said balance dams and lube circuit and connecting the second pump to said source.

14. The system of claim 13, wherein the first pump is driveably connected to an engine.

15. The system of claim 13, wherein the second valve disconnects an outlet of the second pump from the balance dams and lube circuit when pressure from the pressure source is relatively low, and the second valve connects the outlet of the second pump to the balance dams and lube circuit when pressure from said source is relatively high.

16. The system of claim 13, wherein the electric motor is located at a higher elevation than the oil level of fluid in the valve body.

17. The system of claim 13, wherein the second pump includes an inlet communicating with a sump containing transmission fluid.

18. The system of claim 13, further comprising an oil cooler through which fluid flows from the second valve to the lube circuit.

* * * * *